United States Patent Office 2,717,885
Patented Sept. 13, 1955

2,717,885

COMPOSITIONS

Sylvan O. Greenlee, Racine, Wis., assignor to Devoe & Raynolds Company, Inc., Louisville, Ky., a corporation of New York No Drawing. Application September 20, 1949,
Serial No. 116,847

4 Claims. (Cl. 260—47)

This invention relates to new epoxide resin compositions containing a latent curing catalyst, which compositions are capable of conversion into insoluble and infusible products, valuable for use in making varnishes and protective coatings, molding compositions, films and fibers, adhesives, etc.

The epoxide resins themselves are not thermosetting when pure but can be converted to the infusible state by heating in the presence of a suitable catalyst. Such catalysts are sodium hydroxide, sodium phenoxide, primary, secondary or tertiary amines, Friedel-Crafts catalysts and certain organic and inorganic acids. It is a disadvantage of the aforementioned catalysts that conversion will take place at room temperature, making it necessary to use the catalyzed resin shortly after the addition of the catalyst. Furthermore certain of the aforementioned catalysts are incompatible with epoxide resins.

It is the purpose of this invention to provide a new composition comprising an epoxide resin and a delayed action catalyst which composition will be stable at room temperature for long periods of time, but will react at elevated temperatures to produce insoluble and infusible products.

Another object of the invention is the production of reaction mixtures containing epoxides with other constituents reactive therewith to form resinous compositions, such mixtures also containing a latent curing catalyst.

Other objects of the invention and the nature and advantages of the invention will further appear from the following more detailed description.

A new and novel class of epoxide containing compositions have now been discovered which possess substantially all of the aforementioned desired properties. These compositions contain two essential ingredients: epoxides and addition products of boron fluoride and compounds containing an amino nitrogen atom.

For a more complete understanding of the present invention, reference is made to the following examples which illustrate in detail its practice. In the examples, the parts are by weight. The epoxide equivalent is determined by heating a one gram sample of the epoxide composition with an excess of pyridine containing pyridine hydrochloride, at the boiling point for 20 minutes, and back titrating the excess pyridine hydrochloride with 0.1 normal sodium hydroxide, using phenolphthalein as an indicator. One HCl molecule is considered to be equivalent to one epoxide group. The pyridine-pyridine hydrochloride solution is made by adding 16 cc. of concentrated hydrochloric acid per liter of pyridine.

Example I

Examples I to V illustrate the production of the epoxide resins while the remaining examples describe compositions containing and utilizing the latent curing catalysts.

Bisphenol A (684 parts) was added to a caustic soda solution made by dissolving 105 parts of sodium hydroxide in 1700 parts of water in a stainless steel closed kettle. Epichlorohydrin (357 parts) was added in one portion to the open kettle. The kettle was provided with a stirrer and the mixture was stirred during the process. The temperature rose from about 37° C. to about 70° C. in approximately 45 minutes. Caustic soda, 40 parts in 100 parts of water, was then added, whereupon the temperature rose to about 82° C. during the course of about 30 minutes. Additional caustic soda, 29 parts in 100 parts of water was then added and the kettle was heated. The temperature of the reaction mixture was gradually increased to about 95° C. during the next 30 minutes. The aqueous liquor was drawn off from the taffy-like product which had formed. The latter was washed with hot water, while agitated, and a series of four washing treatments with fresh water was applied until the product was neutral to litmus. The product was then dried by heating to a final temperature of 130° C. and removed from the kettle to suitable container. This resin melted at 100° C. and had an epoxide equivalent of about 800.

Example II

A complex epoxide resin was prepared by heating 100 parts of the product of Example I with 5.3 parts of Bisphenol A, the temperature being raised during one hour from 150° to 200° C. and being held at 200° C. for one hour. The resulting product melted at 130° C. and had an epoxide equivalent of about 1300.

Example III

A liquid epoxide was prepared from 3 moles of glycerin (276 parts) and 9 moles of epichlorohydrin (828 parts) by adding to a cooled agitated mixture one part of 45 percent boron trifluoride-ether solution diluted with 9 parts of ether and with continuous agitation. The temperature rose to 50° C. over a period of about one hour and 44 minutes, at which time external cooling was applied and the temperature was held between 49° C. and 77° C. for about one hour and 21 minutes. To 370 parts of this product in a reaction vessel provided with an agitator and reflux condenser was added 900 parts of dioxane and 300 parts of powdered sodium aluminate, and with continuous agitation this reaction mixture was gradually heated to 93° C. over a period of one hour and 55 minutes. After cooling to room temperature the inorganic material was removed by filtration and the dioxane and low boiling products were removed by heating the filtered solution to 205° C. at 20 mm. pressure. The polyepoxide product so produced had an epoxide equivalent of 143. This liquid polyepoxide was capable of reaction with itself to form resinous products.

Example IV

An epoxide resin was prepared by the method of Example I from 2.6 mols of epichlorohydrin (30 per cent excess) with 1 mol of Bisphenol A in the presence of 2.86 mols of sodium hydroxide (10 per cent excess). The resin obtained had a softening point of 20–30° C. and an epoxide equivalent of 200–250.

Example V

An epoxide resin was prepared by the method of Example I using 1.29 mols of epichlorohydrin with 1 mol of Bisphenol A in the presence of 1.55 mols of sodium hydroxide (20 per cent excess). The resin so prepared had a softening point of 85–95° C. and an epoxide equivalent of 700–800.

Example VI 60.5 g. (½ mol) of dimethyl aniline was stirred at a temperature of 10–20° C. while BF₃ gas was intermittently passed over the surface for 4½ hours. The solid complex weighted 23 g. and had a light green color. 7.5 g. of this product was dissolved in ethanol and added to 100 g. of the resin of Example I dissolved in methyl ethyl ketone. The resulting composition was stable for a period of six months and converted when baked for ½ hour at 200° C.

Example VII 75 g. (½ mol) of diethyl aniline was stirred with 50 g. of petroleum ether at 10° C. while BF₃ gas was passed over the surface. Two phases separated. The bottom layer was the BF₃ complex and was a syrupy yellow-green liquid which gave off BF₃ slowly. The weight of the BF₃ complex obtained in this manner was 111 g.

Five parts of the complex dissolved in ethanol and added to 100 parts of the resin of Example I dissolved in methyl ethyl ketone gave a composition that was stable for six months.

Films cast from this solution and baked for ½ hour at 200° C. were flexible and well converted.

Example VIII

One mol of triethyl amine was added dropwise with stirring to a solution of 1 mol of BF₃ etherate diluted with excess diethyl ether at −20° C. The addition complex crystallized out of solution and was separated by filtration and washed with cold ether.

Two parts of this catalyst were dissolved in a mixture of 50 parts of the liquid epoxide of Example III and 50 parts of the resin of Example IV. The composition so obtained was stable indefinitely at room temperature. Hard and infusible castings were obtained by baking at 200° C. for 4 hours.

Example IX

Five parts of trimethyl amine were condensed in 110 parts of petroleum ether cooled to −50° C. BF₃ gas was added to this solution at a temperature below 6° C. until addition of further BF₃ resulted in no temperature rise. The white solid which had formed was filtered on a Büchner funnel and washed with cold petroleum ether.

7.5 parts of this catalyst dissolved in methyl ethyl ketone was added to 100 parts of the resin of Example I dissolved in the same solvent. The solution so formed was stable at room temperature for six months, but converted in one hour at 200° C.

Example X

Thirty-four parts of dimethyl benzyl amine was dissolved in 25 parts of petroleum ether and agitated while BF₃ gas was passed over the surface. The temperature was kept below 15° C. by cooling. After four hours, 21.5 parts of a white powder were recovered by filtration.

To 100 parts of the resin of Example I dissolved in 100 parts of methyl ethyl ketone were added three parts of this crystalline adduct dissolved in a small amount of alcohol. The viscosity of this solution remained unchanged after six months. The film converted in ½ hour at 150° C.

Example XI 72.5 g. (½ mol) of tripropyl amine were dissolved in 50 g. of petroleum ether (B. P. 25–65° C.). BF₃ gas was passed intermittently over the surface of the solution, which was agitated and cooled externally with ice to keep the temperature down below 6° C. After three hours, the white crystalline solid was filtered off, washed twice with petroleum ether and air dried.

Six parts of this adduct was stirred into 100 parts of the resin of Example II, dissolved in 100 parts of methyl ethyl ketone. The solution so obtained remained stable for six months and gave a film which converted on baking for one hour at 150° C.

Example XII 185 parts of lauryl amine was dissolved in 1000 parts of toluene and treated with BF₃ gas at a temperature below 13° C. The complex was precipitated by the addition of petroleum ether.

The precipitate was collected on a filter and five parts of this complex was added to 100 parts of the resin of Example II dissolved in 100 parts of methyl ethyl ketone. This solution gave films which converted in ½ hour at 200° C.

Example XIII 200 parts of BF₃-diethyl ether complex (45 per cent BF₃) and 200 parts of diethyl ether were agitated in a container and NH₃ gas was passed over the surface. The product was filtered and occluded gases removed by heating at 50° C. under vacuum. The product so obtained had a melting point above 250° C.

Thirty-two parts of Bisphenol A, 68 parts of the liquid resin of Example III and ½ part of the ammonia complex prepared above gave a composition that did not gel in three months. The composition baked at 200° C. for ½ hour gave a satisfactory casting.

Example XIV 75 parts of phenylhydrazine was dissolved in 200 parts of benzene and BF₃ gas was passed through until the reaction was complete. The solid was filtered off and 2½ parts of this complex added to a solution of 50 parts of the resin of Example V in methyl ethyl ketone. This solution remained stable at room temperature and converted in one hour at 150° C.

Example XV

In a similar vessel to that referred to in the preceding examples was placed 50 parts of hexanolamine in 200 parts of benzene. Boron trifluoride gas was passed through the solution with stirring until the reaction was complete. The crude product was a sticky material resembling diethylenetriamine-boron trifluoride in its appearance. The hexanolamine-boron trifluoride is soluble in butyl "Carbitol," acetone, methyl ethyl ketone, and water.

Five parts of this product was mixed with 100 parts of the resin of Example I dissolved in methyl ethyl ketone. The solution was stable for five months and converted in ½ hour at 150° C.

Example XVI

In a closed container provided with a stirrer, condenser and inlet was placed 151 parts (1 mole) of boron trifluoride-ether solution and 200 parts of diethyl ether. The agitator was started and 34 parts (½ mole) of diethylenetriamine in 70 parts of diethyl ether was added slowly. The product separated as a gummy mass which became hard after the solvent escaped by air drying. The product was soluble in pyridine, methyl "Cellosolve," and water, being difficultly soluble in alcohol and methyl ethyl ketone. It could not be recrystallized. The melting point of the crude material was above 200° C.

Two parts of this product and 100 parts of a 50% solution of the resin of Example I dissolved in methyl ethyl ketone were mixed to give a relatively stable composition which would convert in ½ hour at 130° C.

Example XVII

In a closed container provided with a stirrer, condenser and dropping funnel was placed 75 parts (½ mole) of boron trifluoride ether complex in 150 parts of diethyl ether, and a solution of 36.5 (½ mole) of mono-n-butyl amine in 100 parts of diethyl ether was very gradually added with continued stirring. Upon filtering and drying, a white crystalline product was formed.

A mixture of five parts of the above complex dissolved in a small amount of ethanol and added to 200 parts of a 50 percent solution of the resin of Example I in methyl ethyl ketone gave a stable coating composition which converted in ½ hour at 150° C.

Example XVIII

In a similar apparatus was placed 87 parts (one mole) of amyl amine dissolved in 200 parts of diethyl ether, and 151 parts (one mole) of boron trifluoride-ether complex was added very gradually with stirring. The solution was cooled and filtered and a white crystalline product was obtained.

Five parts of this product dissolved in a solution of 100 parts of the resin of Example I in methyl ethyl ketone gave a composition that was stable for more than 48 hours at 50° C. Cast films were converted in ½ hour at 150° C.

Example XIX

In a similar vessel was placed 75 parts (½ mole) of $BF_3$-ether complex in 150 parts of diethyl ether, and a solution of 78 parts (1 mole) of decyl amine in 100 parts of diethyl ether was very gradually added. On cooling and filtering, a yellow solid wax was obtained.

2.5 parts of this product dissolved in 100 parts of a 50 percent solution of the resin of Example I in methyl ethyl ketone gave a composition which converted at 200° C. in 2 hours.

Example XX

To 93 g. (1 mole) of aniline in 100 g. of ether was added dropwise and with stirring 150 g. of $BF_3$-ether complex in 150 g. of ethyl ether. The product was recovered by allowing the excess ether to evaporate at room temperature.

Five parts of this complex were dissolved in 200 parts of a 50% solution of the resin of Example I in methyl ethyl ketone. The Gardner-Holdt viscosity of this solution when prepared was $A_1$ at 25° C. and did not exceed H after 16 days. A film was spread and converted well in ½ hour at 150° C.

Example XXI

Eighty-seven parts (1 mole) of morpholine was stirred while 151 parts (1 mole) of a $BF_3$-ether complex (45 percent $BF_3$) in 100 parts of ethyl ether was added dropwise. On cooling the reaction mixture, an orange-yellow solid separated. The complex was washed with dry ethyl ether. It was insoluble in methyl ethyl ketone.

Five parts of this complex was dissolved in ethanol and added to a solution of 100 parts of the resin of Example I in 100 parts of methyl ethyl ketone. The composition so obtained converted at 150° C. in ½ hour and was stable at room temperature.

Example XXII

To a solution of 286 parts of benzyl aniline in 155 parts of anhydrous ether was added dropwise 200 parts of $BF_3$-ether complex (45 percent $BF_3$). The yellow precipitate was separated by filtration. This complex melted at 125–155° C. with decomposition.

A solution of the resin of Example I in an equal weight of methyl ethyl ketone gave excellent conversion in ½ hour at 150° C. when 5 percent of the above complex (based on resin solids) was added.

Example XXIII

Sixty-nine parts (1 mole) of pyridine was stirred while 151 parts (1 mole) of $BF_3$-ether complex was added dropwise. The reaction was exothermic and the reaction mixture was cooled to aid precipitation of the complex. The white crystals which separated were collected on a filter and air dried.

Five parts of this complex were stirred into 200 parts of a 50% solution of the resin of Example I in methyl ethyl ketone. Films cast from this composition converted well in ½ hour at 150° C. This mixture was still fluid after three months at room temperature.

Example XXIV

A soluble alpha-naphthyl amine-aldehyde condensate was prepared by refluxing 143 parts of alpha-naphthyl amine (1 mole) in 250 parts of ethyl alcohol with 93 parts (1.24 moles) of 37% formalin and .04 part of formic acid. The product changed from an oil to a light taffy which hardened to form a granular solid. The solid product was separated and dried.

A complex epoxide was prepared by heating 3 moles of Bisphenol A with 3.88 parts of epichlorohydrin in the presence of 4.85 moles of sodium hydroxide, giving a product which melted at 100° C. and had an epoxide equivalent of 800. A complex epoxide was prepared by heating 100 parts of this product with 5.3 parts of Bisphenol A, taking one hour to go from 150° C. to 200° C. and holding at 200° C. for 1½ hours. This product melted at 130° C. and had an epoxide equivalent of 1300.

25 parts of the alpha-naphthyl amine-formaldehyde resin prepared as described was mixed with 75 parts of the complex epoxide and dissolved in methyl ethyl ketone. Addition of 5% diethylenetriamine-boron fluoride complex gave a molding composition that converted at 150° C. in ½ hour after the solvent was expelled.

Example XXV

A liquid epoxide was prepared from 1 mole of glycerin and 3 moles of epichlorhydrin by the following procedure:

In a reaction vessel provided with a mechanical stirrer and external cooling means was placed 276 parts of glycerol and 828 parts of epichlorhydrin and to this reaction mixture was added one part of 45% boron trifluoride ether solution diluted with 9 parts of ether. The reaction mixture was agitated continuously, the temperature rose to 50° C. over a period of 1 hour and 44 minutes, at which time external cooling with ice water was applied. The temperature was held between 49° C. and 77° C. for 1 hour and 21 minutes.

To 370 parts of this product in a reaction vessel provided with a mechanical agitator and a reflux condenser was added 900 parts of dioxane and 300 parts of powdered sodium aluminate. With continuous agitation, the reaction mixture was gradually heated to 93° C. over a period of 1 hour and 51 minutes, and held at this temperature for 8 hours and 49 minutes. After cooling to room temperature the inorganic material was removed by filtration. The dioxane and low boiling products were removed by heating the filtrate to 205° C. at 20 mm. pressure to give 261 parts of a pale yellow product.

An amide-aldehyde resin also was prepared by refluxing for 14 hours 171 parts of para-toluene sulfonamide and 81 parts of formalin with 100 parts of ethyl alcohol. The syrup so prepared contained 60% solids by weight.

A mixture of 60 parts of the epoxide resin prepared as described and 40 parts solids of the amide-aldehyde resin, the mixture also containing 4 parts of the diethylenetriamine-boron fluoride complex, gave a film which converted in ½ hour at 150° C.

A furfural resin solution was prepared by refluxing for 14 hours 171 parts of para-toulene sulfonamide and 96 parts of furfural in 100 parts of ethanol. This solution contained 58% solids.

A mixture of 80 parts of the epoxide resin prepared as described in the previous example and 20 parts of the furfural resin prepared as described dissolved in methyl ethyl ketone, the mixture containing 4% triethylamine-boron fluoride catalyst, was baked as a film at 170° C. for ½ hour. The film converted to yield a hard flexible surface.

Various modifications can be made in the specific procedures illustrated by the examples to provide other embodiments falling within the broad scope of the present invention. Thus, the epoxide component can be of the most diverse type. For example, as Example I illustrates, such component can be prepared by the reaction of polyhydric phenol, such as Bisphenol A (a mixture which consists essentially of p,p'-dihydroxydiphenyl-dimethylmethane), and epichlorohydrin in the presence of an alkali. Similar material, suitable for use in practicing the present invention, are described in my copending applications Serial No. 617,176, filed September 18, 1945, and Serial No. 621,856, filed October 11, 1945, both now abandoned. The epoxide component can also be prepared by the reaction of a polyhydric phenol and a polyepoxide, as is described in my copending application Serial No. 626,449, filed November 2, 1945, now U. S. Patent No. 2,592,560 and also by the dehydrohalogenation of halohydrins and halohydrin compositions using a suitable catalyst, as is described in the copending John D. Zech application, Serial No. 754,080, filed June 11, 1947 now U. S. Patent No. 2,538,072. Further epoxide components which can be used in preparing the composition of this invention are those described in the copending Carl E. Bixler application, Serial No. 754,079, filed June 11, 1947, now U. S. Patent No. 2,512,996. Mixtures of epoxide components, prepared in accordance with the teachings of two or more of the aforementioned applications, can also be used.

As Examples XXIV and XXV show, the present composition can also include other resin-forming components in addition to the epoxide component, an amine-aldehyde condensate being used in the former example and an amide-aldehyde condensate being used in the latter. Similar mixtures containing epoxide components, which mixtures can be used in preparing the composition of the present invention, are described in my copending applications Serial No. 661,060, filed April 10, 1946, now U. S. Patent No. 2,528,360; Serial No. 661,059, filed April 10, 1946, now U. S. Patent 2,528,359; Serial No. 694,823, filed September 4, 1946 (Patent No. 2,511,913, granted June 20, 1950); Serial No. 696,937, filed September 13, 1946 (Patent No. 2,494,295, granted January 10, 1950); Serial No. 707,991, filed November 5, 1946 (Patent No. 2,502,145, granted March 28, 1950); and Serial No. 707,992, filed November 5, 1946.

Also, as the specific examples illustrate, the catalyst used in preparing the present composition can be a complex of boron trifluoride and any of a wide variety of nitrogen compounds having at least one nitrogen atom which does not have a negative group directly linked to such atom. The nitrogen compound can be, for example, a primary, secondary or tertiary aliphatic amine, such as methylamine, dimethylamine, trimethylamine, 2-ethylhexylamine, stearylamine, allylamine, monoethanolamine, diethanolamine, triethanolamine, monoisopropanolamine, diisopropanolamine, triisopropanolamine, ethylenediamine, triethylenetetramine, tetraethylenepentamine, aminoethylethanolamine, etc.; aromatic amines, such as o-phenylenediamine, m-phenylenediamine, p-phenylenediamine, o-toluidine, m-toluidine, p-toluidine, benzylamine, methylaniline, diphenylamine, triphenylamine, etc., pyridine, compounds having condensed pyridine rings, and their homologs and other derivatives, for example, alpha-picoline, beta-picoline, gamma-picoline, the lutidines, such as 2,6-lutidine, the collidines, 2-ethanolpyridine, 4-ethanolpyridine, 2-hexylpyridine, 2-propanolpyridine, 4-propanolpyridine, 2-vinylpyridine, quinoline, isoquinoline, quinaldine, lepidine, etc.; aminopyridines and homologs thereof, for example, 2-amino-3-methylpyridine, 2-amino-4-methylpyridine, 2-amino-5-methylpyridine, 2 - amino-6-methylpyridine, 2 - aminopyridine, etc.; cycloalkylamines, for example, cyclohexylamine, and dicyclohexylamine; piperidine; etc.

The amount of catalyst employed in preparing the composition may vary widely, depending upon the particular properties of the epoxide and other film-forming components and also upon the properties desired in the product. In general, however, the amount of catalyst used will be from about 0.5 to about 5 or more percent by weight, based upon the weight of the epoxide component.

This application is a continuation-in-part of my copending applications Serial Nos. 661,059 and 661,060, both filed April 10, 1946; Serial No. 694,823, filed September 4, 1946 (Patent No 2,511,913, granted June 20, 1950); Serial No. 696,937, filed September 13, 1946 (Patent No. 2,494,285, January 10, 1950); and Serial Nos. 707,991 and 707,992, both filed November 5, 1946, application Serial No. 707,991 having issued as Patent No. 2,502,145, March 28, 1950, and application Serial No. 707,992 having issued as Patent No. 2,542,664.

I claim:

1. Heat hardening epoxide resin compositions consisting essentially of an epoxide resin resulting from the reaction of a dihydric phenol with epichlorhydrin in the presence of caustic alkali and having admixed therewith as a latent curing catalyst a small amount of an addition product of boron trifluoride with an amine having at least one amine nitrogen atom which does not have directly linked thereto a negative radical.

2. A composition as defined in claim 1 in which the epoxide resin results from the reaction of Bisphenol A with epichlorhydrin in the presence of alkali.

3. A composition as in claim 1 dissolved in a volatile organic solvent.

4. A composition as defined in claim 2 dissolved in a volatile organic solvent.

References Cited in the file of this patent

UNITED STATES PATENTS

| | | |
|---|---|---|
| 2,444,333 | Castan | June 29, 1948 |
| 2,511,913 | Greenlee | June 20, 1950 |
| 2,512,996 | Bixler | June 27, 1950 |
| 2,528,360 | Greenlee | Oct. 31, 1950 |